(12) United States Patent
Foisy (10) Patent No.: US 8,676,930 B2
(45) Date of Patent: Mar. 18, 2014

(54) SYSTEM AND METHOD FOR MULTIPORT AUTOMATION

(75) Inventor: Stephane Foisy, Udora (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 681 days.

(21) Appl. No.: 12/541,604

(22) Filed: Aug. 14, 2009

(65) Prior Publication Data

US 2011/0040851 A1 Feb. 17, 2011

(51) Int. Cl.
*G06F 15/16* (2006.01)

(52) U.S. Cl.
USPC ............................ 709/218; 340/1.1; 340/16.1

(58) Field of Classification Search
USPC ......... 709/231, 230, 224, 223, 220, 218, 208, 709/205, 238, 225; 370/486, 469, 352, 338, 370/250, 248, 222, 235, 230, 216; 340/506, 340/436, 286.01, 13.24, 12.52, 12.23
See application file for complete search history.

(56) References Cited

U.S. PATENT DOCUMENTS

| | | | |
|---|---|---|---|
| 7,143,214 B2 | 11/2006 | Hayes et al. | |
| 2002/0147808 A1* | 10/2002 | Osburn, III | 709/224 |
| 2002/0174279 A1* | 11/2002 | Wynne et al. | 710/113 |
| 2005/0044221 A1* | 2/2005 | Venkatanarayan et al. | 709/225 |
| 2006/0220831 A1* | 10/2006 | Martin | 340/507 |
| 2008/0288618 A1* | 11/2008 | Vardi et al. | 709/223 |
| 2009/0171999 A1 | 7/2009 | McColl et al. | |

OTHER PUBLICATIONS

International Searching Authority, International Search Report and Written Opinion dated Dec. 8, 2010 for International Application No. PCT/CA2010/001252 International Filing Date Aug. 13, 2010 (10 pages).

* cited by examiner

*Primary Examiner* — David Lazaro
*Assistant Examiner* — Charles Murphy
(74) *Attorney, Agent, or Firm* — Kacvinsky Daisak PLLC (57) ABSTRACT

A system and method are disclosed for enhancing the throughput of signals from a security system receiver to an associated automation server. Multiple parallel Ethernet connections or ports are provided between the receiver and server to enable multiple signals to be transmitted between the two when such signals are received from a client's security system panel. The system and method may access the ports in a variety of orders to provide efficient transmittal of signals from the receiver to the server. In one embodiment, received event signals may be routed though the ports in numeric sequence, forward or reverse. In another embodiment, received event signals may be routed preferentially to the first port, if it is not busy. If the first port is busy then the signal may be routed to the second port, and so on. In a further embodiment, received event signals from specific client panels may be directed through predetermined ports, and a predetermined automation server at the central monitoring facility.

18 Claims, 6 Drawing Sheets

SYSTEM AND METHOD FOR MULTIPORT AUTOMATION

FIELD OF THE INVENTION

Embodiments of the invention relate generally to the field of security system communications, and more particularly to a system and method for multi-port communication between security system receivers and automation servers/software.

DISCUSSION OF RELATED ART

Typical building alarm systems often include a number of sensors and notification appliances (e.g., smoke detectors, fire alarms, security alarms, emergency lighting, strobe lighting, door contacts, motion detectors, and the like) positioned throughout a building to alert occupants of emergencies, such as smoke, fire, break-ins, etc. In addition, building alarm systems may include components that provide a communications link between the building in which the alarm system is located and a receiver in a central monitoring facility that is geographically remote from the building. The communications link allows event transmissions to flow between the building alarm system and the central monitoring facility. These event transmissions can provide information about the status of the alarm system (e.g. that it is operational, that it has been armed, that it has been disarmed), or they may provide information about the status of one or more alarms or sensors in the building (e.g., that a window or door has been opened or that a smoke or fire detector is experiencing an alarm condition).

Upon receiving an event transmission from a building alarm system, the receiver which is typically at the central monitoring facility processes the transmission signal and passes the processed signal on to an automation server/software, which, among other things, can identify specifics relating to the client and/or event (e.g., client address, client contact information, type of alarm, zone in which alarming sensor is located). An operator may be alerted to the event via the automation server, and may notify the client and/or appropriate public/private authorities that an alarm has been received. Once the automation server has successfully received an event signal from the receiver, an acknowledgement signal is sent back to the receiver informing it that the signal was received and understood.

Typical central station automation servers use a half duplex protocol that requires one signal to be delivered, processed, and acknowledged before the next signal can be accepted. In addition (see FIG. 1), current receivers 1 utilize a single Ethernet port 2 for communicating with the automation server 4. For the purposes of this disclosure, the term "port" shall be understood to refer to a "logical" or "virtual" port, rather than an individual physical connection (i.e., a single cable). It will be appreciated that a plurality of multiplexed logical or virtual "ports" may be achieved using a single "physical" connection (i.e., a single cable) between receiver 1 and automation server 4.

Figure 1:
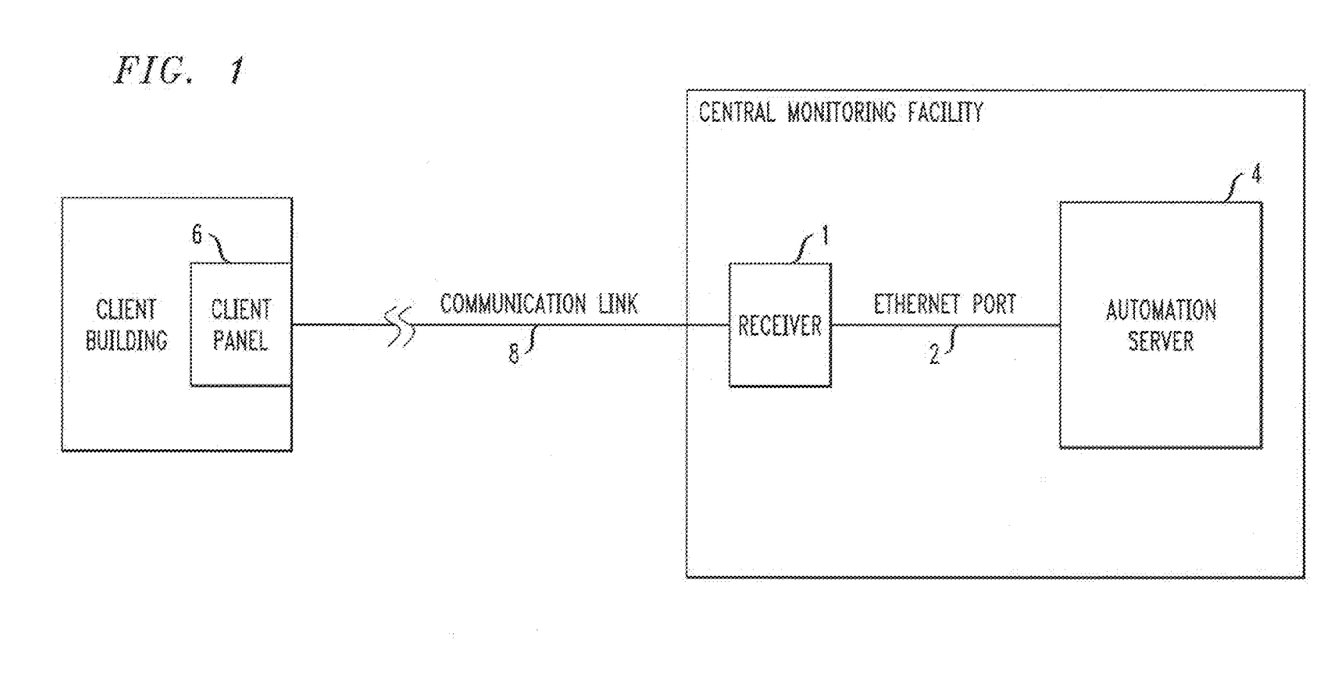
FIG. 1 is a schematic of a traditional system connection between a receiver and automation server.

As a result of the aforementioned current single-port connection scheme, wherein communications to the receiver 1 are received at a rate faster than the speed at which the receiver 1 can output data to the automation server 4, a bottleneck occurs. In one non-limiting example, a single receiver 1 may receive signals from 60 individual telephone lines, which may result in up to 600 message per minute received by the receiver 1. If the output capacity to the automation sever 4 via the single port 2 is only 300 messages per minute, a substantial bottleneck will occur.

In addition, the current single-port scheme also limits the throughput of the receiver 1 to the speed at which the automation server 4 can reply to the receiver with an acknowledgement that a signal was successfully received. When considering the substantial available bandwidth of a typical Ethernet channel (e.g., 10/100 Basenet, which is capable of transmitting at 10 Mbps, and 100 Mbps, respectively) it is clear that much of the bandwidth of the channel is wasted with current single-port arrangements.

Thus, there is a need for an improved system and method for efficiently transmitting security system event signals between a security system receiver and an automation server. The system and method should facilitate the transmission of signals from the receiver to the automation server at a speed that is at least the same as that by which the signals are received from the client control panel(s). The system and method should also eliminate the deficiencies associated with prior art systems and methods.

SUMMARY OF THE INVENTION

The disclosed system and method enables the parallel transmission of signals from one or more receivers to an automation server. By using multiple logical/virtual ports between receiver and automation server, multiple signals can be sent in parallel, thus enhancing receiver throughput. Acknowledgements from the automation server to the receiver are also provided in parallel. Although described in relation to an Ethernet connection, it will be appreciated that the disclosed system and method can employ any communication medium that allows multiple data paths, a non-limiting list including USB, FireWire, wireless (Wi-Fi), Z-Wave, and the like. In one embodiment, the disclosed system may include a receiver application running on the same computer as the automation software, with the two exchanging data directly between applications.

A method is disclosed for transmitting and processing security system event signals. The method may comprise: at a receiver at a first location, receiving event signal data from a panel located remote from said first location; and transmitting the event signal data to an automation server via one of a plurality of communication ports.

A system is also disclosed for transmitting and processing security system event signals for use with a system comprising a plurality of alarms and an alarm panel associated with a monitored building, a receiver, and an automation server. The receiver may perform the steps comprising: at a receiver at a first location, receiving event signal data from a panel located remote from said first location; and transmitting the event signal data to an automation server via one of a plurality of communication ports.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts, and further wherein.

DESCRIPTION OF EMBODIMENTS

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 2:
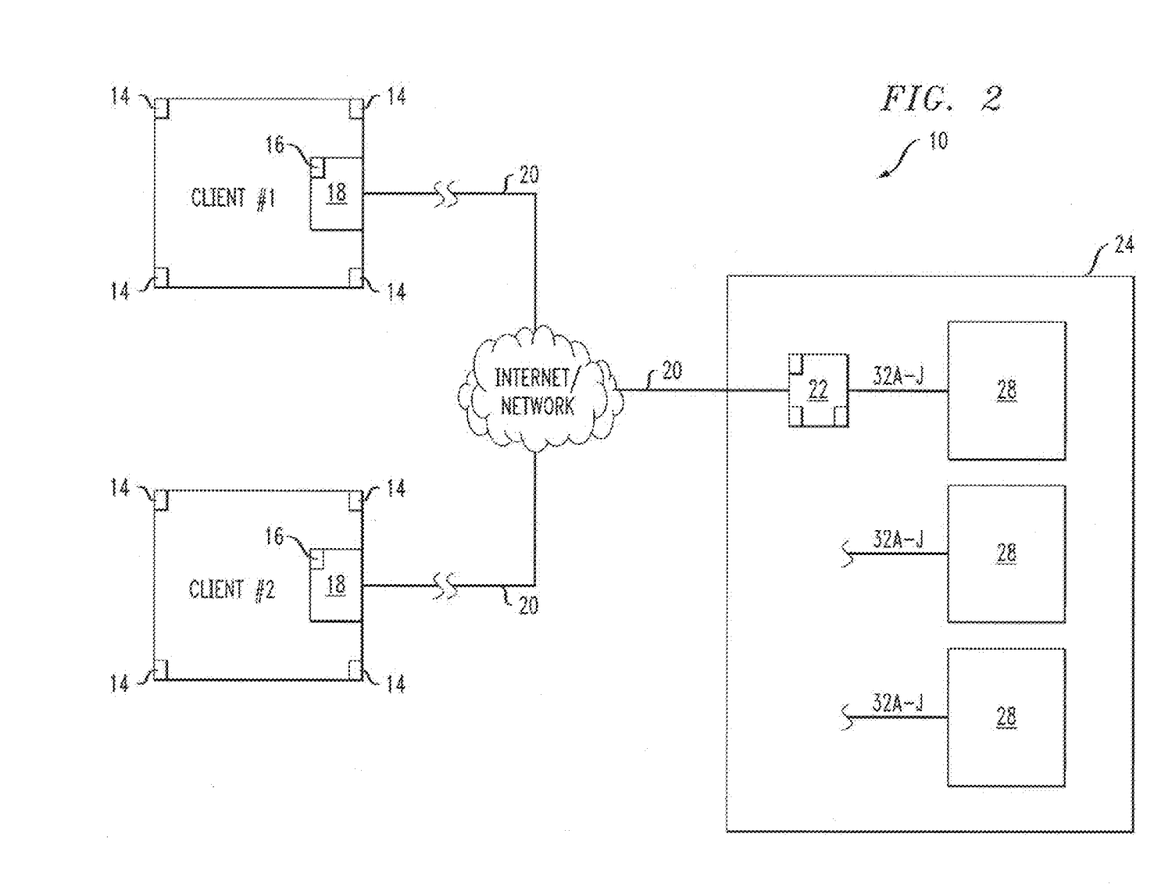
FIG. 2 is a schematic of the disclosed system.

Referring now to FIG. 2, a system 10 is shown for providing remote monitoring of a commercial or residential building 12. The system 10 may include a plurality of sensors 14 positioned throughout the building, and a Digital Alarm Communicator Transmitter (DACT) 16 housed within a security system panel 18. The DACT 16 may be in communication with the plurality of sensors 14 to receive hard-wired or wireless signals therefrom. A communication link 20 may be provided between the panel 18 and a receiver 22 located at a central monitoring facility 24. The receiver 22 may have one or more line cards 26 equipped to receive and process signals transmitted from one or more panels 18. The line cards 26 may also be equipped to send signals to an automation server 28 also located at the central monitoring facility 24. Typically the central monitoring facility 24 is geographically remote from the building 10 being monitored, and in practical application the central monitoring facility 24 will monitor signals received from a plurality of different client buildings 12. In addition, depending on its size and the number and type of client panels served, the central monitoring facility 24 can include a plurality of automation servers 28, each of which can receive signals from one or more receivers 22.

For the purposes of this disclosure, the term "automation server" includes hardware, software, or a combination of hardware and software, for receiving an incoming data stream and processing it in the manner described herein.

The communication link 20 between the panel 18 and the receiver 22 may be any of a variety of analog or digital communications forms. Thus, the communications link may be an analog phone line or it may be a digital transmission line. In addition, a portion or all of the communications link may be a hard wired or wireless connection. A non-limiting list of exemplary technologies making up the communication link includes analog or digital phone lines, fiber optic lines, T1 or T2 lines, public/private networks, wireless (Radio Frequency (RF)), cellular and/or satellite connections. In addition, a portion of the communication link 20 may be a public or private network.

Figure 3:
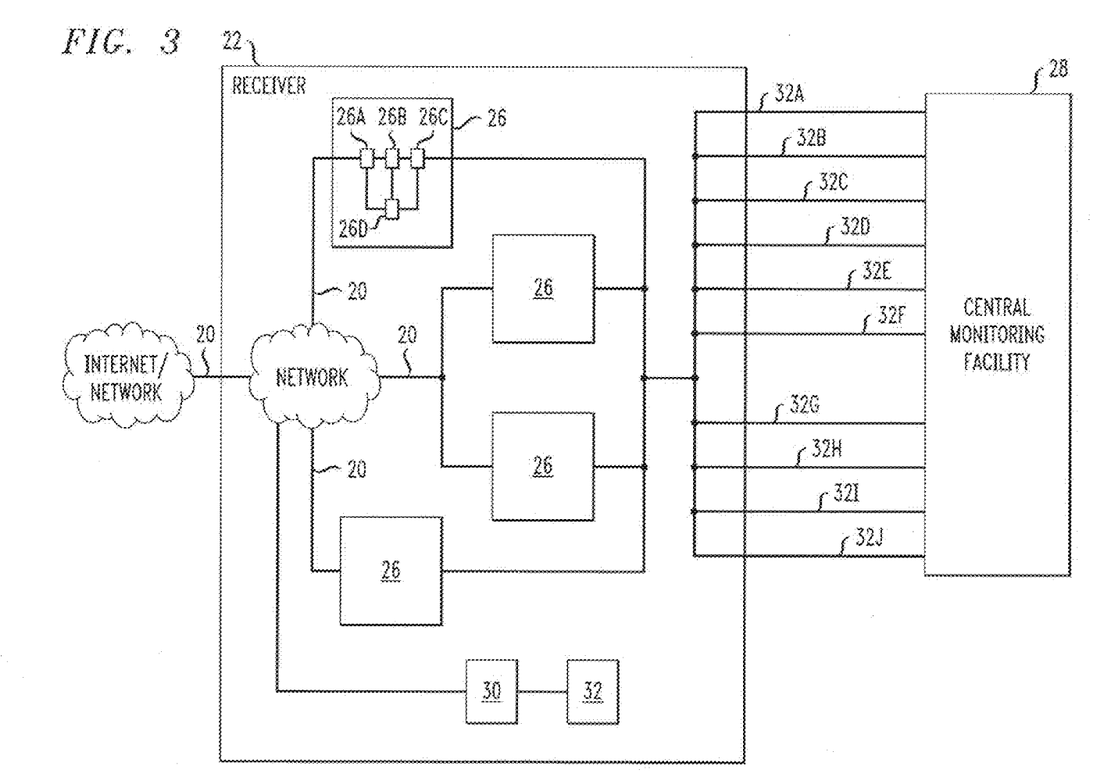
FIG. 3 is a schematic of an exemplary receiver for use with the system of FIG. 2.

An exemplary receiver 22 is shown in FIG. 3. The receiver 22 often includes one or more line cards 26, each of which is equipped and configured to receive an incoming signal from a client panel 18 and to process the signal so that it can be analyzed by the automation server 28. As will be appreciated, the nature of the signal (analog vs. digital) is not critical to the disclosed system, and any of a variety of input signals may be received and processed by the line cards 26. Depending on the nature of the input signal, however, the line cards 26 may include a variety of filtering, amplifying and processing (e.g., digital signal processor (DSP)) components. Thus, each line card 26 may include public switched telephone network (PSTN) line circuitry 26A for accepting an incoming analog call signal from a panel 18. The received analog call signal may be converted to a digital signal via one or more DSPs 26B, and then routed through processor signal decoding circuitry 26C, before being passed on to the automation server 28. A microcontroller 26D associated with the line card 26 may be connected to the individual line card components 26A-C in a desired manner. The receiver may also include one or more processors 30 in communication with the line cards 26 to globally control the cards and their functions. Each processor may have a memory 32 associated therewith. The processor 30 may control the ports 32A-J, and may also control the sequence in which incoming event signals are transmitted through the individual ports.

The receiver 22 may incorporate a number of additional capabilities. For example, the receiver 22 may prioritize concurrently-received signals, so that a fire signal is given a higher priority than a test signal. The receiver 22 may also generate an appropriate printer (i.e., plain language) interpretation of inbound signals allowing a hard copy (or digital) back-up of the signals separate from the automation signals. The receiver 22 can also provide time/date stamps for each signal, thus allowing the automation server to know when the signal was received even if there are delays in the hand off between receiver and automation server. When there are no signals the receiver 22 can monitor the link(s) to the automation server by providing non-alarm signals (often referred to as heartbeats) which can allow the receiver to monitor the automation server and determine if the link is stable prior to using the link. This can also allow the automation server to confirm that the receiver is present and operating correctly.

The receiver 22 has a plurality of output ports 32A, 32B, 32C . . . 32J for connecting the receiver 22 to the automation server 28. It will be appreciated that although the illustrated embodiment is described in relation to a receiver having ten outlet ports, the invention is not so limited. Rather, the receiver 22 can include as many ports as the associated hardware/medium (e.g., Ethernet, Z-Wave) connection will allow.

In general, the receiver 22 can transmit event signals to the automation server 28 via any active port 32A-C. Once the signal has been successfully received by the automation server 28, an acknowledgement signal is sent back to the receiver 22 so that the receiver will not attempt to resend the signal. This acknowledgement signal can be sent back either through the same port from which it came, or it can be sent back through a different port.

Where the automation server 28 sends an acknowledgment of a received signal back to the receiver 22 via the same port from which it came, the receiver simply waits on that port (i.e., no additional event signals are sent to the automation server via that port) until the acknowledgement is received.

Where the acknowledgement is sent to the receiver 22 over a different port than the one from which it came (e.g., signal sent from receiver to automation server via port #1 is acknowledged via port #10), the acknowledgement signal sent back to the receiver can include data indicating the original port through which the signal was sent to the automation server 28. The acknowledgement signal can also include additional information such as a time stamp or other unique identifier. Upon receiving the acknowledgement signal, the receiver 22 can recognize the acknowledgement as being associated with a particular signal.

In some cases an acknowledgment signal may not be sent (e.g., the sever 28 doesn't recognize the signal or the signal is defective), or if sent it may not be received by the receiver (e.g., due to a problem with the port). In such cases, if the receiver 22 does not receive the acknowledgment signal from the automation server within a predetermined time period (e.g., 4 seconds), it can resend the signal to the automation server via the same port. If the receiver 22 doesn't receive the acknowledgement signal after a predetermined number of attempts (e.g., 4), it can resend the signal to the automation server 28 via a different port.

Alternatively, the automation server 28 may provide a negative acknowledgement to the receiver 22 to indicate that the receiver should repeat the signal or reform the signal (for cases in which the signal was corrupted).

In at least one embodiment, where the signal is deemed to represent a high priority event (e.g., fire), and an acknowledgement signal is not received within the predetermined time period, the receiver 22 immediately resends the signal over a different port.

In this way the receiver 22 manages all incoming event signals to ensure that the automation server 28 successfully receives the signals from the receiver 22, and that no signals are lost. With current devices, failure of the single port can result in shutdown of the entire receiver. With the disclosed system, failure of a single port will not result in shutdown of the receiver 22. Instead, event signals are transmitted over any one of the remaining functioning ports. In addition, the receiver can flag a troubled (missing/disconnected or malfunctioning) port. In some applications the receiver may react to individual port disconnection by enabling a backup system to take over. This allows for the operation of the receiver to be reviewed and addressed while the signals are still being processed by the backup System(s).

The receiver processor 30 may control the line cards 26 and ports 32A-J of the receiver 22. In particular, the processor 30 may be in communication with the line cards 26 to control which ports 32A-J, and in what sequence, incoming event signals will be directed to. Alternatively, some or all of this control may reside with the microprocessor 26D associated with the individual line cards 26 in the receiver 22.

A variety of options exist to determine which port 32A-J a particular event signal should be routed through to facilitate fast and efficient handling of multiple incoming signals. In a first embodiment, referred to as a "round robin" method, the receiver cycles through all open connections, in sequence, sending a first event signal through a first port 32A, a second event signal through a second port 32B, and so on. In this embodiment, the second event signal is routed to the second port 32B even if the first port 32A is free. Likewise, a third event signal will be routed to the third port 32C even if the first and second ports 32A, 3213 are free. This routing proceeds until the last port 32J is accessed, whereupon the first port 32A is again used. Alternatively, the receiver 22 may cycle through the ports in reverse order (i.e., beginning with the last port 30J). Other examples of specific routing patterns include sending a signal meeting one or more predetermined conditions (e.g., fire signal, or a signal from a particular client's panel) to the automation server 28 via a predetermined port or group of ports.

Figure 4:
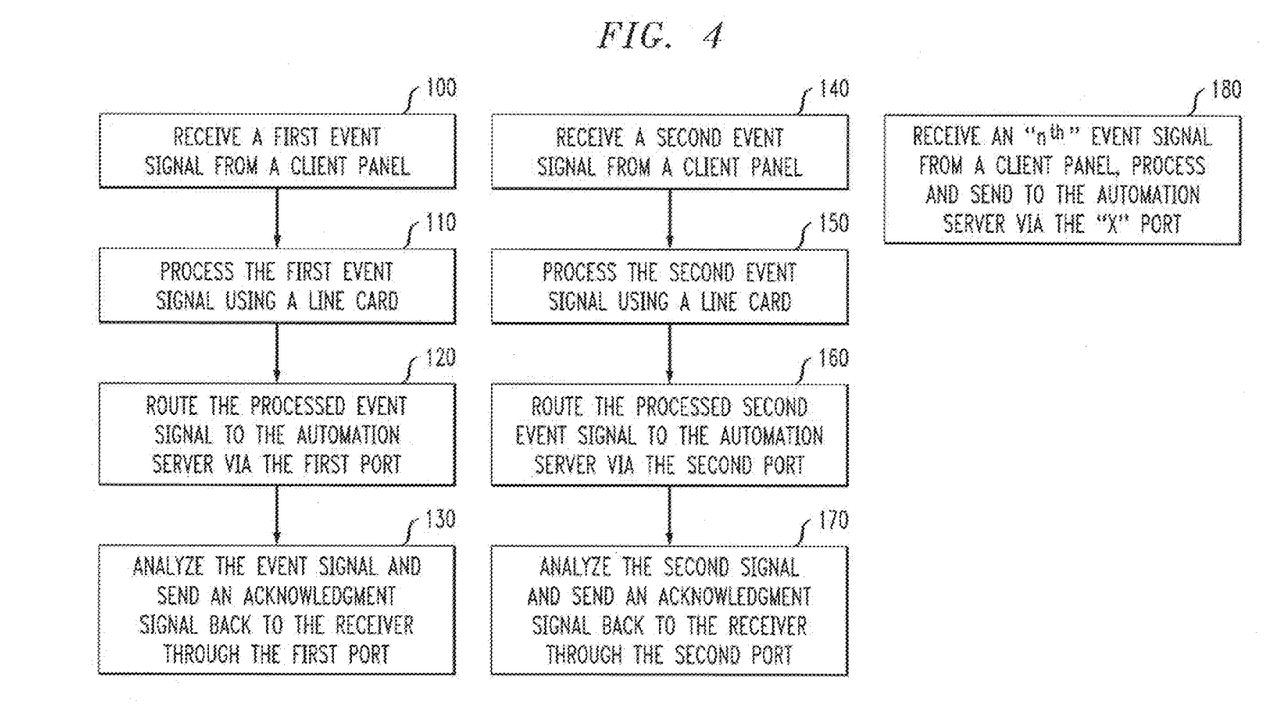
FIG. 4 is a flowchart describing a first exemplary method of operating the system of FIG. 2.

Thus, referring to FIG. 4, at step 100 the receiver 22 receives a first event signal from a client panel 18. At step 110, the first event signal is routed to a line card 26 which processes the signal. At step 120, the processed first event signal is routed to the automation server 28 via the first port 32A. At step 130, the automation server 28 analyzes the first event signal and sends an acknowledgment signal back to the receiver 22 through the first port 32A if the signal is received and recognized. A flag in memory associated with the receiver indicates that the signal is being processed. When a new signal arrives, the signal flag will be overwritten (using a FIFO prioritization is a typical buffer cyclic method) if the signal has been processed. If the signal has not been processed at the time the new signal is received, the new signal is appended to a buffer, and will be written to the memory associated with the receiver once the earlier signal is processed.

At step 140, the receiver 22 receives a second event signal from a client panel 18. At step 150, the receiver 22 assigns the second event signal to a line card 26, where the signal is processed. At step 160, the processed second event signal is routed to the automation server 28 via the second port 32B. At step 170, the automation server 28 analyzes the second event signal and sends an acknowledgment signal back to the receiver 22 through the second port 32B. This process repeats until to the last ports 32J is accessed, whereupon the first port 32A is again used, followed by the second port 32B, and so on (up to the $n^{th}$ signal at step 180).

It will be appreciated that the step of receiving the first event signal 100 occurs prior to the step of receiving the second event signal 140. The processing, routing and acknowledgement steps (steps 110, 120, 130; 150, 160, 170) for the two signals, however, may overlap (e.g., the acknowledgement step 170 for the second event signal may occur before the acknowledgement step 130 for the first event signal).

In addition, the first and second event signals (as well as subsequent event signals) can be transmitted by the same client panel 18, or by different client panels 18.

In a second embodiment, referred to as a "first available port" method, the receiver 22 attempts to use the first port 32A to route event signals to the automation server 28, and only uses the second port 32B if the first port 32A is determined to be busy (i.e., the acknowledgement signal for a event signal routed through the first port 32A has not yet been received by the receiver 22). If both the first and second ports 32A, 32B are busy, the receiver 22 routes the next received event signal through the third port 32C, and so on.

Figure 5:
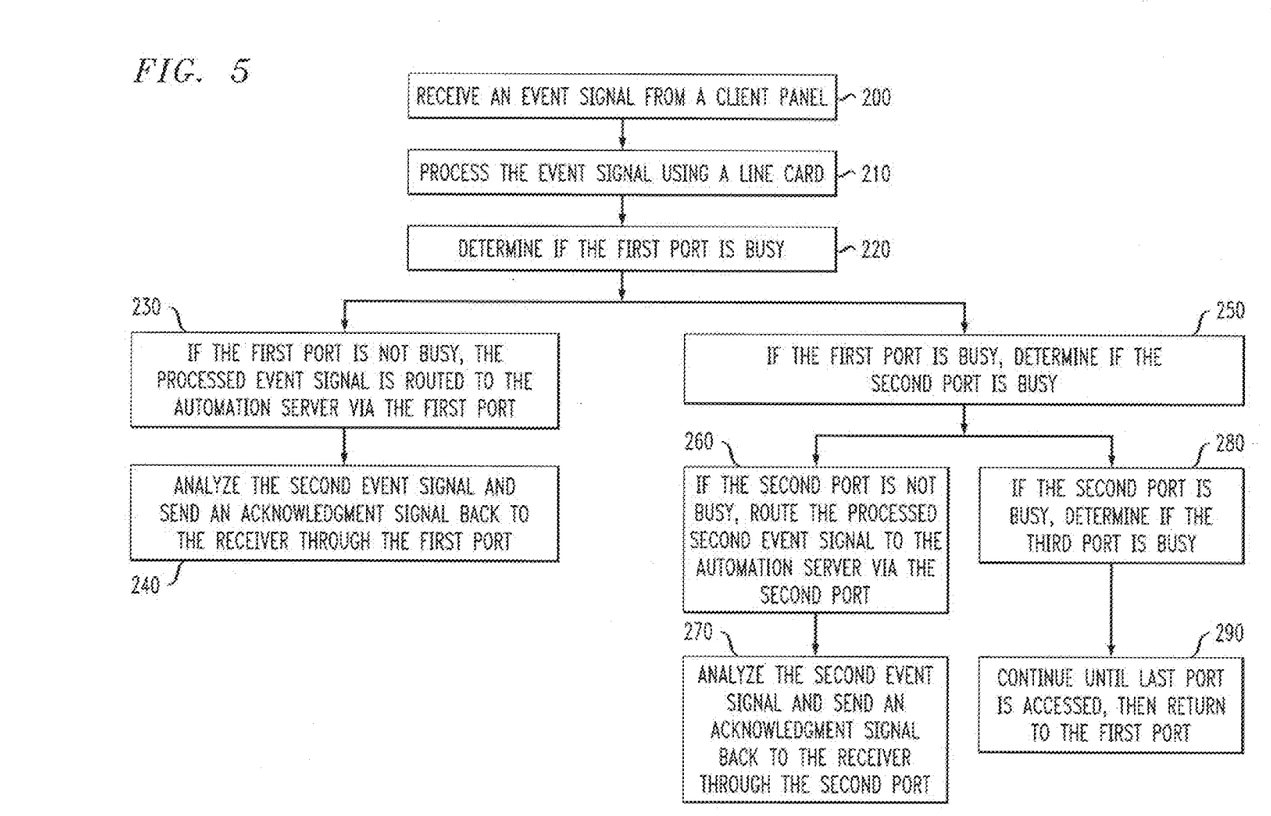
FIG. 5 is a flowchart describing a second exemplary method of operating the system of FIG. 2.

Thus, referring to FIG. 5, at step 200 the receiver 22 receives an event signal from a client panel 18. At step 210, the receiver 22 assigns the event signal to a line card 26, where the signal is processed. At step 220, the receiver 22 determines whether the first port 32A is busy. If the first port is not busy, then at step 230 the processed event signal is routed to the automation server 28 via the first port 32A, and at step 240, the automation server 28 analyzes the first event signal and sends an acknowledgment signal back to the receiver 22 through the first port 32A.

If, however, the first port 32A is busy, then at step 250 the receiver determines whether the second port 32B is busy. If the second port 32B is not busy, then at step 260 the processed event signal is routed to the automation server 28 via the second port 32B. At step 270, the automation server 28 analyzes the second event signal and sends an acknowledgment signal back to the receiver 22 through the second port 3213.

If, the second port 32B is busy, then at step 280 the receiver determines whether the third port 32C is busy, and so on until at step 290 a non-busy port is obtained.

As previously noted, in this embodiment, each time a new event signal is received from a client panel 18, the receiver 22 attempts to send the signal to the automation server 28 via the first port 32A, sequencing upward until it finds a non-busy port.

In a third embodiment, referred to as a "pre-allocated port" method, individual ports are allocated to specific line cards, dialed number information service (DNIS), Caller ID, automatic number identification (ANI), or account codes, event type, or any other characteristics the operator may select. This enables specific event signals received from specific client panel 18 to be routed to a particular automation server 28. This may be advantageous where a particular client owns the receiver 22 and/or automation server 28 in the central monitoring facility 24, and wants some or all of the event signals emanating from their panels 18 to be processed using their own equipment and/or wants their signals to be analyzed using their own personal database associated with a particular automation server 28. Such a scheme also enables a particular customer to remain unaffected by what occurs on other client's system (e.g., system outages).

In this embodiment, the client may elect to have specific event signals processed and directed to their automation server via specific ports. For example, all high priority signals (e.g., fire) may be specified to be sent to the automation server 28 via ports 32A-D, while medium priority signals (e.g., burglary) may be specified to be sent to the automation server via ports 32E-G, and low priority signals (e.g., maintenance) may go to the server via ports 32H-J.

Figure 6:
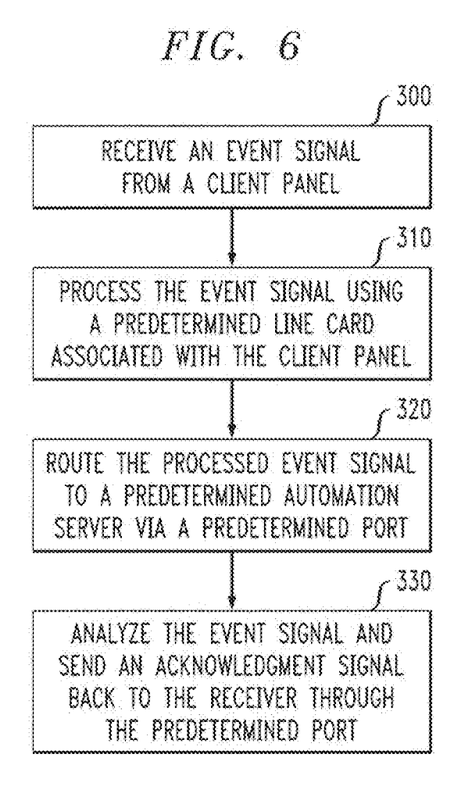
FIG. 6 is a flowchart describing a third exemplary method of operating the system of FIG. 2.

Thus, referring to FIG. 6, at step 300 the receiver 22 receives an event signal from a client panel 18. At step 310, the receiver 22 assigns the event signal to a predetermined line card 26 associated with the client panel. The signal is processed by the predetermined line card. At step 320, the processed event signal is routed to a predetermined automation server 28 via a predetermined port 32A-J. At step 330, the predetermined automation server 28 analyzes the event signal and sends an acknowledgment signal back to the receiver 22 through the predetermined port 32A-J.

It will be appreciated that a typical central monitoring facility 24 may contain a plurality of automation servers 28 and receivers 22, each of which are configured to receive event signals from thousands of monitored buildings. In some cases (see FIG. 2), a single automation server can receive signals from a plurality of receivers 22. The disclosed systems and methods enable these event signals to be processed quickly and efficiently by utilizing a multiply-parallel communication arrangement between the receivers 22 and automation servers 28 of the central monitoring facility 24. As previously noted, the communication arrangement can be any of a variety of connections including USB, FireWire, wireless (Wi-Fi), Z-Wave, and the like.

The functions and process steps herein may be performed automatically or wholly or partially in response to user command. An activity (including a step) performed automatically is performed in response to executable instruction or device operation without user direct initiation of the activity.

The systems and processes of FIGS. 2-6 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIGS. 2 and 3. Further, any of the functions and steps provided in FIGS. 4-6 may be implemented in hardware, software or a combination of both and may reside on one or more processing devices located at any location of a network linking the elements of FIGS. 2 and 3 or another linked network, including the Internet.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method for transmitting and processing security system event signals, comprising:
    at a receiver at a first location, receiving event signal data from a panel located remote from said first location, said event signal data including a time stamp, said receiver configured to communicate with an automation server via a plurality of communication ports;
    transmitting the event signal data including the time stamp to the automation server via at least a first one of the plurality of communication ports;
    determining whether an acknowledgement signal corresponding to the event signal has been received from the automation server; and
    retransmitting the event signal data including the time stamp to the automation server via at least a second one of the plurality of communication ports based on the determination that the acknowledgement signal has not been received, said first communication port different from said second communication port.

2. The method of claim 1 further comprising: at the receiver, receiving second event signal data from the panel; selecting a communication port from the plurality of communication ports using a round robin method; and transmitting the second event signal data to the automation server via the selected communication port.

3. The method of claim 1, further comprising: at the receiver, receiving second event signal data from a panel; selecting a communication port from the plurality of communication ports using a first available port method; and transmitting the second event signal data to the automation server via the selected communication port.

4. The method of claim 3, further comprising: at the receiver, receiving third event signal data from a panel; selecting a communication port from the plurality of communication ports using a first available port method; and transmitting the third event signal data to the automation server via the selected communication port.

5. The method of claim 3, further comprising, at the receiver, receiving third event signal data from the panel; selecting a communication port from the plurality of communication ports using a preselected port method; and transmitting the third event signal data to the automation server via the selected communication port.

6. The method of claim 1, further comprising, at the receiver, receiving an acknowledgement signal from the automation server via the first communication port.

7. The method of claim 1, further comprising, at the receiver, receiving an acknowledgement signal from the automation server via a second communication port of the plurality of communication ports.

8. The method of claim 6, where acknowledgement signal includes information identifying that the event signal data was transmitted to the automation server via the first port.

9. A system for transmitting and processing security system event signals comprising a plurality of sensors and an alarm panel associated with a monitored building, a receiver, and an automation server, the receiver configured to communicate with the automation server via a plurality of communication ports, wherein the plurality of communication ports exist within a single cable connection between the receiver and the automation server, the receiver performing the steps comprising:

receiving event signal data from the panel, said event signal data including a time stamp;

transmitting the event signal data to the automation server via at least a first one of the plurality of communication ports;

determining whether an acknowledgement signal corresponding to the event signal has been received from the automation server; and retransmitting the event signal data including the time stamp to the automation server via at least a second one of the plurality of communication ports based on the determination that the acknowledgement signal has not been received, said first communication port different from said second communication port.

10. The system of claim 9, wherein the receiver performs the additional steps of receiving second event signal data from the panel; selecting a communication port from the plurality of communication ports using a round robin method to; and transmitting the second event signal data to the automation server via the selected communication port.

11. The system of claim 10, wherein the receiver performs the additional steps of receiving second event signal data from a panel; selecting a communication port from the plurality of communication ports using a first available port method; and transmitting the second event signal data to the automation server via the selected communication port.

12. The system of claim 11, wherein the receiver performs the additional steps of receiving third event signal data from a panel; selecting a communication port from the plurality of communication ports using a first available port method; and transmitting the third event signal data to the automation server via the selected communication port.

13. The system of claim 11, wherein the receiver performs the additional steps of receiving second event signal data from the panel; selecting a communication port from the plurality of communication ports using a preselected port method; and transmitting the third event signal data to the automation server via the selected communication port.

14. The system of claim 12, wherein the receiver performs the additional steps of receiving an acknowledgement signal from the automation server via the first communication port.

15. The system of claim 13, wherein the receiver performs the additional steps of receiving an acknowledgement signal from the automation server via a second communication port of the plurality of communication ports.

16. The system of claim 15, wherein the acknowledgement signal includes information identifying that the event signal data was transmitted to the automation server via the first port.

17. The method of claim 1, further comprising:

transmitting a non-alarm event signal to the automation server via the first one of the plurality of communication ports, the non alarm event signal including a time stamp;

receiving an acknowledgement from the automation server, the acknowledgement including a time stamp;

determining that the received acknowledgement corresponds to the transmitted non-alarm event signal based on the time stamps; and determining that the first one of the plurality of communication ports is functional based on determining that the received acknowledgement corresponds to the transmitted non-alarm event signal.

18. The system of claim 9, further comprising:

transmitting a non-alarm event signal to the automation server via the first one of the plurality of communication ports, the non alarm event signal including a time stamp;

receiving an acknowledgement from the automation server, the acknowledgement including a time stamp;

determining that the received acknowledgement corresponds to the transmitted non-alarm event signal based on the time stamps; and determining that the first one of the plurality of communication ports is functional based on determining that the received acknowledgement corresponds to the transmitted non-alarm event signal.

* * * * *

UNITED STATES PATENT AND TRADEMARK OFFICE
CERTIFICATE OF CORRECTION

PATENT NO.        : 8,676,930 B2
APPLICATION NO.   : 12/541604
DATED             : March 18, 2014
INVENTOR(S)       : Charles C. Murphy It is certified that error appears in the above-identified patent and that said Letters Patent is hereby corrected as shown below:

In the Claims

Column 8, Claim 1, line 21, beginning with "automation server; and", add the following text after the word "server", -- by identifying an acknowledgement received from the automation server, the acknowledgement including a time stamp, and determining if the acknowledgement time stamp matches the event signal time stamp; --

Column 9, Claim 9, line 11, beginning with "automation server; and", add the following text after the word "server", -- by identifying an acknowledgement received from the automation server, the acknowledgement including a time stamp; and determining if the acknowledgement time stamp matches the event signal time stamp; --

Signed and Sealed this
Twenty-seventh Day of May, 2014

Michelle K. Lee
*Deputy Director of the United States Patent and Trademark Office*